United States Patent
Kubota et al.

(10) Patent No.: US 10,400,124 B2
(45) Date of Patent: Sep. 3, 2019

(54) INK COMPOSITION SET

(71) Applicant: Seiko Epson Corporation, Tokyo (JP)

(72) Inventors: Kenichiro Kubota, Matsumoto (JP); Makoto Nagase, Shiojiri (JP); Jun Ito, Shimosuwa (JP); Naoki Koike, Matsumoto (JP); Keiji Iida, Chikuhoku (JP)

(73) Assignee: Seiko Epson Corporation (JP)

( * ) Notice: Subject to any disclaimer, the term of this patent is extended or adjusted under 35 U.S.C. 154(b) by 164 days.

(21) Appl. No.: 15/409,868

(22) Filed: Jan. 19, 2017

(65) Prior Publication Data

US 2017/0218216 A1     Aug. 3, 2017

(30) Foreign Application Priority Data

Jan. 28, 2016   (JP) ................... 2016-014071

(51) Int. Cl.
| B41J 2/01 | (2006.01) |
| --- | --- |
| C09D 11/40 | (2014.01) |
| C09D 11/106 | (2014.01) |
| C09D 11/322 | (2014.01) |
| C09D 11/36 | (2014.01) |

(52) U.S. Cl.
CPC .......... C09D 11/40 (2013.01); B41J 2/01 (2013.01); C09D 11/106 (2013.01); C09D 11/322 (2013.01); C09D 11/36 (2013.01)

(58) Field of Classification Search
None
See application file for complete search history.

(56) References Cited

U.S. PATENT DOCUMENTS

| 6,048,390 | A | * | 4/2000 | Yano | .................... | C09D 11/328 |
| --- | --- | --- | --- | --- | --- | --- |
| | | | | | | 106/31.43 |
| 7,806,972 | B2 | | 10/2010 | Sugita et al. | | |
| 7,871,467 | B2 | | 1/2011 | Sano et al. | | |
| 2009/0169834 | A1 | | 7/2009 | Sano et al. | | |
| 2009/0235843 | A1 | * | 9/2009 | Sugita | .................. | C09D 11/322 |
| | | | | | | 106/31.58 |
| 2009/0305156 | A1 | * | 12/2009 | Weber | ................. | C09B 67/0022 |
| | | | | | | 430/108.23 |
| 2010/0073450 | A1 | * | 3/2010 | Katagami | .............. | B41J 11/002 |
| | | | | | | 347/104 |
| 2014/0349087 | A1 | | 11/2014 | Jung et al. | | |
| 2016/0115330 | A1 | | 4/2016 | Koike et al. | | |
| 2016/0168405 | A1 | | 6/2016 | Ito et al. | | |
| 2016/0222235 | A1 | | 8/2016 | Iida et al. | | |
| 2018/0037761 | A1 | | 2/2018 | Iida et al. | | |

FOREIGN PATENT DOCUMENTS

| EP | 2 025 725 A1 | 2/2009 |
| --- | --- | --- |
| EP | 3 034 571 A1 | 6/2016 |
| EP | 3263658 A1 | 1/2018 |
| JP | 2004-070048 A | 3/2004 |
| JP | 2009-173853 A | 8/2009 |
| JP | 2009-227812 A | 10/2009 |
| JP | 2010-043149 A | 2/2010 |
| JP | 2016-084460 A | 5/2016 |
| JP | 2016-113531 A | 6/2016 |
| JP | 2016-141746 A | 8/2016 |
| JP | 2016-155909 A | 9/2016 |
| JP | 2016-155910 A | 9/2016 |

OTHER PUBLICATIONS

Extended European Search Report for Application No. EP 17 15 3183 dated Apr. 10, 2017 (7 pages).

* cited by examiner

*Primary Examiner* — Erica S Lin

(74) *Attorney, Agent, or Firm* — Harness, Dickey & Pierce, P.L.C.

(57) ABSTRACT

An ink composition set has at least a solvent-based orange ink composition containing an orange pigment as a pigment and a solvent and a solvent-based red ink composition containing a red pigment as a pigment and a solvent.

18 Claims, No Drawings

INK COMPOSITION SET

BACKGROUND

1. Technical Field

The present invention relates to an ink composition set.

2. Related Art

An ink jet recording apparatus is known which records images and characters by discharging minute ink liquid droplets from nozzle opening of a recording head to cause the ink liquid droplets to adhere to a recording medium. Known as ink for use in such recording is an ink jet ink composition containing various components, such as a pigment, a surfactant, water, and an organic solvent, for example. With respect to the ink jet ink composition, an ink jet ink composition which does not substantially contain water (hereinafter also simply referred to as "ink composition" or "ink") has also been developed.

Such a solvent-based ink composition has good adaptability to a vinyl chloride-based recording medium, and is used for recording in so-called signs, such as outdoor signboards, in many cases, for example. However, when the solvent-based ink jet ink composition is used for signs, the weatherability of recorded matter has been insufficient in some cases. More specifically, the recorded matter for signs is used in an outdoor environment exposed to rain, sunlight, and the like in many cases. Thus, the recorded matter has been required to have weatherability, such as water resistance, abrasion resistance, and light fastness, higher than weatherability in indoor use.

On the other hand, a demand for warm color-based printed matter has increased mainly in Europe and the United States and the reproduction of rich warm color-based hues has been desired. Thus, the color reproduction with a wide gamut has been attempted by providing an orange ink (special color ink) in an ink set. However, it has been found that the weatherability of an orange ink pigment is inferior to that of other inks. Then, an aqueous ink composition, a non-aqueous ink composition, and an ink set containing a Pigment Orange 43 (P.O. 43) having relatively excellent weatherability as the orange ink pigment have been proposed (for example, JP-A-2009-173853, JP-A-2004-70048, and JP-A-2009-227812).

However, even in the case of an ink composition set containing the solvent-based ink composition, it has been difficult to achieve both color reproducibility, particular color reproducibility in warm color-based hues, and weatherability.

SUMMARY

An advantage of some aspects of the invention is to provide an ink composition set and a recording method capable of forming an image excellent in color reproducibility by solving at least some of the above-described problems.

The invention has been made in order to solve at least some of the above-described problems and can be realized as the following aspects or application examples.

Application Example 1

One aspect of an ink composition set according to an aspect of the invention has at least a solvent-based orange ink composition containing an orange pigment as a pigment and a solvent and a solvent-based red ink composition containing a red pigment as a pigment and a solvent.

According to the ink composition set of Application Example 1, by forming the ink set containing a combination of the solvent-based orange ink composition and the solvent-based red ink composition, the color development of particularly a warm color is improved and the color reproduction is held over a long period of time. Therefore, an image excellent in color reproducibility and weatherability can be formed.

Application Example 2

In the application example above, the solvent contained in the solvent-based orange ink composition and the solvent contained in the solvent-based red ink composition each can independently contain a compound represented by the following general formula (1),

$$R^1O-(R^2O)_m-R^3 \qquad (1).$$

In General Formula (1), $R^1$ and $R^3$ each independently represent an alkyl group in which the number of carbon atoms is 1 or more and 5 or less, $R^2$ represents an alkylene group in which the number of carbon atoms is 2 or more and 4 or less, and m represents an integer of 1 to 8.

Application Example 3

In the application example above, at least a solvent-based cyan ink composition containing a pigment and a solvent, a solvent-based yellow ink composition containing a pigment and a solvent, a solvent-based magenta ink composition containing a pigment and a solvent, and a solvent-based black ink composition containing a pigment and a solvent can be further contained.

Application Example 4

In the application example above, at least either the solvent contained in the solvent-based orange ink composition or the solvent contained in the solvent-based red ink composition can contain a compound represented by the following general formula (2),

$$R^4-(R^5O)_n-OH \qquad (2).$$

In General Formula (2), $R^4$ represents an alkyl group in which the number of carbon atoms is 1 or more and 5 or less, $R^5$ represents an alkylene group in which the number of carbon atoms is 2 or more and 4 or less, and n represents an integer of 1 to 8.

Application Example 5

In the application example above, a diketopyrrolopyrrole pigment can be contained as the red pigment contained in the solvent-based red ink composition and at least any one selected from C.I. Pigment Orange 43, C.I. Pigment Orange 64, and C.I. Pigment Orange 71 can be contained as the orange pigment contained in the solvent-based orange ink composition.

Application Example 6

In the application example above, the ink composition set can be used for an ink jet recording method.

Application Example 7

In the application example above, the content of the compound represented by General Formula (1) can be 40% by mass or more in the solvent-based orange ink composition and the solvent-based red ink composition.

Application Example 8

In the application example above, the content of the compound represented by General Formula (2) can be 5% by mass or more and 25% by mass or less in at least either the solvent-based orange ink composition or the solvent-based red ink composition.

Application Example 9

In the application example above, the ink composition set can be used for an ink jet recording method including discharging an ink composition from an ink jet head and causing the ink composition to adhere to a heated recording medium.

Application Example 10

In the application example above, at least either the solvent-based orange ink composition or the solvent-based red ink composition can contain a fixing resin and a lactone compound as the solvent.

Application Example 11

In the application example above, the solvent-based orange ink composition and the solvent-based red ink composition each can contain a compound having a flash point of 70° C. or less as the compound represented by General Formula (1).

Application Example 12

One aspect of a recording method according to an aspect of the invention is carried out using the ink composition set described in any one of Application Example 1 to Application Example 11.

DESCRIPTION OF EXEMPLARY EMBODIMENTS

Hereinafter, a preferable embodiment of an aspect of the invention is described. The embodiment described below describes an example of the invention. The invention is not limited to the following embodiment at all and also includes various kinds of modifications carried out in the range where the scope of the invention is not altered. All the configurations described below are not always indispensable configurations of the invention.

1. Ink Composition Set

An ink composition set according to this embodiment has at least a solvent-based orange ink composition containing an orange pigment as a pigment and a solvent and a solvent-based red ink composition containing a red pigment as a pigment and a solvent. The ink composition set according to this embodiment contains, as the orange ink composition and the red ink composition, a solvent-based ink jet ink composition which contains a volatile solvent (mainly organic solvent) as the main component and which performs recording by causing the solvent-based ink jet ink composition to adhere to a recording medium, and then fixing the solid content by drying the solvent by heating or at normal temperature. Therefore, the ink composition is different from a photocurable ink which is cured by irradiating the same with radiation rays (light).

The "solvent-based" ink jet ink composition in the invention is a composition containing an organic solvent and the like as the main solvent and not containing water as the main solvent. The content of water in the composition is 5% by mass or less, preferably 3% by mass or less, more preferably 2% by mass or less, still more preferably 1% by mass or less, and particularly preferably 0.5% by mass or less based on 100% by mass of the composition. The content of the organic solvent and the like in the ink composition (100% by mass) is preferably 50% by mass or more, more preferably 70% by mass or more, still more preferably 80% by mass or more, and particularly preferably 90% by mass or more. Although not limited, when water is not intentionally added as the main solvent component in the preparation of the composition but moisture is inevitably contained as impurities, such a composition may be permitted.

Hereinafter, the ink compositions forming the ink composition set according to this embodiment are described. In this embodiment, when an ink set contains at least a solvent-based orange ink composition and a solvent-based red ink composition, the ink composition set according to this embodiment is obtained. In addition thereto, a solvent-based cyan ink composition containing a pigment and a solvent, a solvent-based yellow ink composition containing a pigment and a solvent, and a solvent-based magenta ink composition containing a pigment and a solvent may be contained and further a solvent-based black ink composition containing a pigment and a solvent may be contained.

In this embodiment, the ink composition set may be an ink composition set which contains at least a solvent-based orange ink composition and a solvent-based red ink composition and which may be an ink composition set to be used for recording in combination with a solvent-based cyan ink composition containing a pigment and a solvent, a solvent-based yellow ink composition containing a pigment and a solvent, and a solvent-based magenta ink composition containing a pigment and a solvent and further may be an ink composition set to be used in combination with a solvent-based black ink composition containing a pigment and a solvent.

The solvent-based orange ink composition forming the ink composition set according to this embodiment contains an orange pigment as a pigment and a solvent. The solvent-based red ink composition contains a red pigment as a pigment and a solvent.

The hue angles of an orange ink and a red ink are close to each other. However, as the comparison between orange and red, the orange has a high brightness (L*) region and the red has a low brightness region in the color space. When both the orange ink and the red ink are used, the color reproduction range further extends. Specifically, as the comparison between an orange ink composition and a red ink composition, the brightness (L*) of the orange ink composition is high and the brightness of the red ink composition is low in the color space in color measurement described later. Among orange pigments, some pigments have poor weatherability. However, by using the same in combination with the red ink, the combination use with the red ink can be achieved also when printing a warm color. Thus, the color development of particularly a warm color is improved and also the use amount (adhesion amount) of the orange ink decreases in recording. Therefore, the deterioration of the weatherability of an image due to the orange pigment can be made inconspicuous. Thus, an image excellent in color reproducibility and weatherability can be formed.

The red ink composition is also referred to as a red color ink composition. The red ink composition and the orange ink composition are ink compositions in which the hue angle h when a recording portion of a white recording medium, to which the ink compositions are caused to adhere so that the base of the white recording medium does not remain in the recording portion, is color-measured with a color measuring unit based on the L*a*b* color space defined by the International Commission on Illumination (CIE) is in such a range that the hue angle h is smaller than the hue angle h when the yellow ink composition is used and larger than the hue angle h when the magenta ink composition is used. When the red ink composition and the orange ink composition are compared, the hue angle h when the orange ink composition is used is closer to the hue angle h when the yellow ink composition is used and the hue angle h when the red ink composition is used is closer to the hue angle h when the magenta ink composition is used.

Hereinafter, each component contained in the ink composition forming the ink composition set according to this embodiment is described.

1.1. Solvent 1.1.1. First Solvent (Compound Represented by Formula (1))

The ink compositions forming the ink composition set according to this embodiment each independently contain one or more kinds of compounds represented by the following general formula (1) as the solvent,

$$R^1O—(R^2O)_m—R^3 \quad (1).$$

In General Formula (1), $R^1$ and $R^3$ each independently represent an alkyl group in which the number of carbon atoms is 1 or more and 5 or less, $R^2$ represents an alkylene group in which the number of carbon atoms is 2 or more and 4 or less, and m represents an integer of 1 to 8.

Herein, the alkyl group in which the number of carbon atoms is 1 or more and 5 or less can be a linear or branched alkyl group. Specifically, a methyl group, an ethyl group, an n-propyl group, an iso-propyl group, an n-butyl group, a sec-butyl group, a tert-butyl group, an n-pentyl group, an iso-pentyl group, and a tert-pentyl group are mentioned. Examples of the "alkylene group in which the number of carbon atoms is 2 or more and 4 or less" in $R^2$ include an ethylene group, an n-propylene group, an isopropylene group, a butylene group, and the like, for example. The compounds represented by General Formula (1) may be contained alone or in combination of two or more kinds thereof.

The compounds represented by Formula (1) include alkylene glycol diethers and are excellent in drying performance on a recording medium, for example. The alkylene glycol diethers can be used alone or as a mixture of two or more kinds thereof.

Examples of the alkylene glycol diethers include, for example, ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

When aggregation unevenness occurs in an image, the color development tends to be poor and the color reproducibility tends to deteriorate. However, in this embodiment, the aggregation unevenness of an image can be prevented and good image quality can be obtained by the use of the compounds represented by General Formula (1). Moreover, by the use of the solvent, the color reproduction range can be extended, so that warm color, such as orange and red, can be widely reproduced.

The lower limit of the content of the solvent which is the compound represented by General Formula (1) contained in the solvent-based ink jet ink composition is preferably 40% by mass or more, more preferably 50% by mass or more, still more preferably 60% by mass or more, yet still more preferably 70% by mass or more, and most preferably 80% by mass or more based on the total mass (100% by mass) of the solvent-based ink jet ink composition. The upper limit is preferably 95% by mass or less, more preferably 90% by mass or less, still more preferably 85% by mass or less, yet still more preferably 80% by mass or less, and particularly preferably 75% by mass or less. Due to the fact that the content is 40% by mass or more, wet-spreading performance of liquid droplets is improved and the aggregation unevenness of an image is prevented, so that good image quality can be obtained. Moreover, due to the fact that the content is 95% by mass or less, an image is prevented from being stained due to the generation of mist.

From the viewpoint of improving the drying performance and the abrasion resistance and further improving the print image quality of the solvent-based ink jet ink compositions, a compound having a flash point of 70° C. or less is preferably at least contained, a compound having a flash point of 65° C. or less is more preferably at least contained, and a compound having a flash point of 60° C. or less is still more preferably at least contained as the solvent which is the compound represented by General Formula (1). The lower limit of the flash point is not limited and is preferably 50° C. or more.

The flash point above refers to the flash point determined by a Cleveland open cup flash point tester in the case where the flash point determined by a tag closed cup flash point tester is not 80° C. or less. In the case where the flash point determined by a tag closed cup flash point tester is 80° C. or less, the flash point above refers to the flash point determined by a tag closed cup flash point tester when the kinetic viscosity of the solvent at the flash point is less than 10 cSt or refers to the flash point determined by a Seta closed cup flash point tester when the kinetic viscosity of the solvent at the flash point is 10 cSt or more.

The content of the compound (compound having a flash point of 70° C. or less among the compounds represented by General Formula (1)) based on the total mass of the solvent-based ink jet ink composition (the total amount of the compounds when using two or more kinds of the compounds) is preferably 50% by mass or more and 95% by mass or less, more preferably 60% by mass or more and 90% by mass or less, and particularly preferably 70% by mass or more and 85% by mass or less. When the content of the compound(s) contained in the ink composition is (are) in the ranges mentioned above, the drying performance of the solvent-based ink jet ink composition can be improved and wet-spreading and aggregation unevenness (aggregation of the pigment and the like) on an image to be formed can be prevented. Moreover, as compared with other solvents, the storage stability of the solvent-based ink jet ink composition tends to be improved. As a reason therefor, this is assumed to be because, in the compound having a flash point of 70° C. or less among the compounds represented by General Formula (1), an increase in moisture during long-term storage of the ink can be prevented.

1.1.2. Second Solvent (Compound Represented by Formula (2))

The ink compositions forming the ink composite set according to this embodiment each preferably independently contain, in addition to the solvent represented by General Formula (1) as the main solvent (first solvent), a compound represented by the following general formula (2) as the solvent,

$$R^4—(R^5O)_n—OH \qquad (2).$$

In General Formula (2), $R^4$ represents an alkyl group in which the number of carbon atoms is 1 or more and 5 or less, $R^5$ represents an alkylene group in which the number of carbon atoms is 2 or more and 4 or less, and n represents an integer of 1 to 8.

Due to the fact that the solvent which is the compound represented by General Formula (2) is contained as the second solvent, the moisture absorption speed and the drying performance of each solvent-based ink jet ink composition can be adjusted.

Herein, the "alkyl group in which the number of carbon atoms is 1 or more and 5 or less" in $R^4$ can be a linear or branched alkyl group. For example, a methyl group, an ethyl group, an n-propyl group, an iso-propyl group, an n-butyl group, a sec-butyl group, a tert-butyl, or a pentyl group is mentioned.

Examples of the "alkylene group in which the number of carbon atoms is 2 or more and 4 or less" in $R^5$ in General Formula (2) include an ethylene group, an n-propylene group, an isopropylene group, or a butylene group, for example. In General Formula (2), n is preferably an integer of 3 or more and 6 or less.

Specific examples of the solvent which is the compound represented by General Formula (2) include alkylene glycol monoethers. These compounds can be used independently or as a mixture of two or more kinds thereof.

Examples of the alkylene glycol monoethers include, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, dipropylene glycol monoethyl ether, and the like.

When recording is performed by bringing the orange ink and the red ink into contact with each other on a recording medium, secondary color aggregation unevenness occurs in some cases. When the secondary color aggregation unevenness occurs, the color development deteriorates and the wide color reproduction range narrows in some cases. Then, by compounding the solvent which is the compound represented by General Formula (2) in the ink, the secondary color aggregation unevenness can be reduced and a wider color reproduction range can be achieved. Moreover, by compounding the solvent which is the compound represented by General Formula (2) in the ink, the primary color aggregation unevenness also tends to reduce the color development performance.

From the viewpoint of further increasing the drying performance and the abrasion resistance of the solvent-based ink jet ink compositions and further improving the print image quality, a compound having a flash point of 180° C. or less is preferably at least contained as the solvent which is the compound represented by General Formula (2). The content of the compound having a flash point of 180° C. or less based on the total amount of the solvent-based ink jet ink composition (the total amount of the compounds when using two or more kinds of the compounds) is preferably 1% by mass or more and 20% by mass or less, more preferably 3% by mass or more and 15% by mass or less, and particularly preferably 5% by mass or more and 10% by mass or less. As the solvent which is the compound represented by General Formula (2), the flash point is more preferably 75° C. or more and still more preferably 120° C. or more.

In this embodiment, due to the fact that the solvent-based ink jet ink composition contains the solvent which is the compound represented by General Formula (2), the wet-spreading performance, the mist reduction, and the like are excellent. Therefore, it is preferable that at least either the solvent-based orange ink composition or the solvent-based red ink composition contains the solvent which is the compound represented by General Formula (2), it is more preferable that both the solvent-based orange ink composition and the solvent-based red ink composition contain the solvent which is the compound represented by General Formula (2), and it is most preferable that all the ink compositions forming the ink composition set according to this embodiment contain the solvent which is the compound represented by General Formula (2).

The content of the solvent which is the compound represented by General Formula (2) contained in the solvent-based ink jet ink composition is preferably 5% by mass or more and 25% by mass or less, more preferably 8% by mass or more and 22% by mass or less, and still more preferably 10% by mass or more and 20% by mass or less based on the total mass (100% by mass) of the solvent-based ink jet ink composition.

1.1.3. Lactone Compound (Cyclic Ester)

In this embodiment, the solvent-based ink jet ink compositions preferably contain lactone compounds (cyclic esters). Due to the fact that the lactone compounds are contained, the solvent-based ink jet ink composition can dissolve a part of a recording surface (for example, a recording surface containing vinyl chloride resin) of the recording medium to cause the solvent-based ink jet ink composition to permeate into the recording medium. Due to the permeation of the ink into the recording medium as described above, the abrasion resistance (rubbing fastness) of an image recorded on the recording medium can be increased. In other words, since the lactone compounds have high affinity with the vinyl chloride resin, components of the solvent-based ink jet ink composition can be easily permeated (easily bitten) into the recording surface. It is considered that, as the result of such action of the lactone compounds, an image excellent in abrasion resistance can be formed even when the solvent-based ink jet ink composition containing the lactone compound is placed under severe conditions, such as an outdoor environment.

The lactone compound is a compound having a structure in which, in one molecule having a hydroxyl group and a carboxyl group, the hydroxyl group and the carboxyl group are subjected to dehydration condensation in the molecule. Among the lactone compounds, β-propiolactone, β-butyrolactone, γ-butyrolactone, γ-valerolactone, γ-caprolactone, σ-valerolactone, ε-caprolactone, and the like can be mentioned as those having a simple structure. The number of ring members of the lactone compounds is not particularly limited and, for example, an arbitrary side chain may be bonded to the ring members of the heterocyclic ring. The lactone compounds may be used alone or as a mixture of two or more kinds thereof.

In this embodiment, among the lactone compounds mentioned above, from the viewpoint of further increasing the abrasion resistance of an image to be formed with the solvent-based ink jet ink compositions, lactone compounds having a 3 or more and 7 or less-membered ring are preferable and lactone compounds having a 5 or more and 6 or less-membered ring are more preferable. In any case, it is more preferable for the lactone compounds not to have a side chain. Specific examples of such lactone compounds include γ-butyrolactone and σ-valerolactone. Such lactone compounds have high affinity particularly with polyvinyl chloride. Therefore, when caused to adhere to a recording medium containing polyvinyl chloride, an effect of improving abrasion resistance can be conspicuously obtained.

When the lactone compounds are compounded, the content of the lactone compounds based on the total mass of the solvent-based ink jet ink composition (the total amount of the lactone compounds when using two or more kinds thereof) is preferably 5% by mass or more and 40% by mass or less and more preferably 10% by mass or more and 30% by mass or less.

In this embodiment, it is preferable that at least either the solvent-based orange ink composition or the solvent-based red ink composition contains the lactone compounds, it is more preferable that both the solvent-based orange ink composition and the solvent-based red ink composition contain the lactone compounds, and it is most preferable that all the ink compositions forming the ink composition set according to this embodiment contain the lactone compounds above.

1.1.4. Other Solvents

In this embodiment, the solvent-based ink jet ink composition can contain the following compounds as the solvent besides the compounds represented by General Formula (1) and (2) and the lactone compounds.

Examples of such solvents include, for example, alcohols (methyl alcohol, ethyl alcohol, propyl alcohol, butyl alcohol, isopropyl alcohol, fluorinated alcohol, and the like), ketones (acetone, methyl ethyl ketone, cyclohexanone, and the like), carboxylate esters (methyl acetate, ethyl acetate, propyl acetate, butyl acetate, methyl propionate, ethyl propionate, and the like), ethers (diethyl ether, dipropylether, tetrahydrofuran, dioxane, and the like), polyhydric alcohols (ethylene glycol, diethylene glycol, triethylene glycol, polyethylene glycol, polypropylene glycol, propylene glycol, butylene glycol, 1,2,6-hexane triol, thioglycol, hexylene glycol, glycerol, trimethylol ethane, trimethylol propane, and the like), and the like.

As the solvent, (polyhydric) alcohols may be contained. Examples of the (polyhydric) alcohols include glycerol, propylene glycol, dipropylene glycol, 1,2-butanediol, 1,2-pentanediol, 1,2-hexanediol, 1,2-heptanediol, 3-methyl-1,3-butanediol, 2-ethyl-2-methyl-1,3-propanediol, 2-methyl-1, 3-propanediol, 2-methyl-2-propyl-1,3-propanediol, 2,2-dimethyl-1,3-propanediol, 2-methyl pentane-2,4-diol, and the like.

The total content when the (polyhydric) alcohols are compounded in the solvent-based ink jet ink composition is preferably 0.05% by mass or more and 30% by mass or less and more preferably 0.1% by mass or more and 30% by mass or less based on the total mass of the solvent-based ink jet ink composition from the viewpoint of securing an effect of improving wet-spreading performance on a recording medium and permeability to reduce density unevenness, storage stability, and discharge reliability. Due to the fact that the content of the (polyhydric) alcohols is in the ranges mentioned above, the wettability, permeability, and drying performance of ink are improved, and thus images having good printing density (color development performance) are obtained in some cases. Moreover, due to the fact that the content of the (polyhydric) alcohols is in the ranges mentioned above, the viscosity of ink can be appropriately adjusted, and thus the occurrence of clogging of a nozzle and the like can be reduced in some cases.

Moreover, amines may be compounded in the solvent-based ink jet ink composition. For example, hydroxylamines, such as triethanolamine, tripropanolamine, tributanolamine, N,N-dimethyl-2-aminoethanol, and N,N-diethyl-2-aminoethanol, are mentioned, and one kind or two or more kinds thereof can be used. The total content when the amines are compounded is preferably 0.05% by mass or more and 5% by mass or less and more preferably 0.1% by mass or more and 3% by mass or less based on the total mass of the solvent-based ink jet ink composition.

Examples of the solvent include higher fatty acid esters, such as methyl laurate, isopropyl hexadecanoate (isopropyl palmitate), isopropyl myristate, methyl oleate, and ethyl oleate, dibasic acid diesters in which dicarboxylic acids of aliphatic hydrocarbons having 2 to 8 carbon atoms (The number of carbon does not include carbon of a carboxyl group.) are diesterified with alkyl groups having 1 to 5 carbon atoms, alkyl amides (N,N-dimethyl decane amide and the like) in which monocarboxylic acids of aliphatic hydrocarbons having 6 to 10 carbon atoms (The number of carbon does not include carbon of a carboxyl group.) are amidated (Substituents substituting amide nitrogen atoms each are independently a hydrogen atom and an alkyl group having 1 to 4 carbon atoms), and the like.

One or two or more kinds of the other solvents mentioned herein can be added in an appropriate compounding amount to the solvent-based ink jet ink composition.

1.2. Pigment

Each ink composition forming the ink composition set according to this embodiment contains a pigment.

1.2.1. Inorganic Pigment

Examples of inorganic pigments include carbon black, iron oxide, and titanium oxide, for example. Examples of the carbon black include, although not particularly limited thereto, furnace black, lamp black, acetylene black, and channel black (C. I. Pigment Black 7), for example. Examples of commercially-available items of carbon black include, for example, No. 2300, 900, MCF88, No. 20B, No. 33, No. 40, No. 45, No. 52, MA7, MA8, MA100, and No. 2200B (all Trade names, manufactured by Mitsubishi Chemical Corporation), Color black FW1, FW2, FW2V, FW18, FW200, S150, S160, S170, Printex 35, U, V, 140U, and Special Blacks 6, 5, 4A, 4, and 250 (all Trade names, manufactured by Degussa AG), Conductex SC, Raven 1255, 5750, 5250, 5000, 3500, 1255, and 700 (all Trade names, manufactured by Columbian Carbon Japan Ltd., or Columbian Chemicals Company, Inc.), Regal 400R, 330R, and 660R, Mogul L, Monarch 700, 800, 880, 900, 1000, 1100, 1300, and 1400, and Elftex 12 (all Trade names, manufactured by Cabot Corporation).

1.2.2. Organic Pigment

Examples of organic pigments include, for example quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. The following substances are mentioned as specific examples of the organic pigments.

Cyan Ink

Examples of pigments for use in cyan ink include C.I. Pigment Blue 1, 2, 3, 15, 15:1, 15:2, 15:3, 15:4, 15:6, 15:34, 16, 18, 22, 60, 65, and 66 and C.I. Vat Blue 4 and 60. "C. I." is the abbreviation for Color Index.

Magenta Ink

Examples of pigments for use in magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violet 19, 23, 32, 33, 36, 38, 43, and 50.

Yellow Ink

Examples of pigments for use in yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Orange Ink

Examples of pigments for use orange ink include C.I. Pigment Orange 5, 43, 36, 62, 64, 71, and 242. Among the pigments, C.I. Pigment Orange 43 (P.O. 43), 64 (P.O. 64), and 71 (P.O. 71) are preferably used. When such pigments are used, the balance of the comprehensive performance including weatherability, printing stability, and abrasion resistance can be improved.

The P.O. 43 is a benzimidazolone pigment of CAS Registry Number 4424-06-0. The chemical formula thereof is $C_{26}H_{12}N_4O_2$ and the chemical name thereof is bisbenzoimidazo[2,1-b:2',1'-i]benzo[lmn][3,8]phenanthroline-8,17-dione or 1,8-(1H-benzimidazole-2,1-diylcarbonyl)-5,4-(1H-benzimidazole-2,1-diylcarbonyl)naphthalene. The P.O. 43 has a perinone structure and "perinone orange" is given as a general name. The hue of the P.O. 43 is bright reddish orange.

For the P.O. 43, commercially-available items can also be used. For example, the P.O. 43 is available as "Hostaperm Orange" and "PV Gast Orange GRL" of Clariant, "Fasogen Super Orange 6200" manufactured by DIC, Inc., and "Lionogen Orange GR-F" manufactured by TOYO INK CO., LTD., and the like.

The P.O. 64 is a benzimidazolone pigment of CAS Registry Number 72102-84-2. The chemical formula thereof is $C_{12}H_{10}N_6O_4$. For the P.O. 64, commercially-available items can also be used. For example, the P.O. 64 is available as "Cromophtal Orange G L" manufactured by Ciba-Geigy Japan, Limited, "ORANGE GL" of Clariant, "Orange K2960" of BASF A.G., and the like.

The P.O. 71 is a diketopyrrolopyrrole pigment of CAS Registry Number 71832-85-4. The chemical formula thereof is $C_{20}H_{10}N_4O_2$ and the chemical name is 3,6-bis(3-cyanophenyl)-2,5-dihydropyrrolo[3,4-c]pyrrole-1,4-dione. For the P.O. 71, commercially-available items can also be used. For example, the P.O. 71 is available as "DPP Orange TA" of Ciba-Geigy Japan, Limited, "Cromophtal Orange" of Clariant, "Orange TRP" of BASF A.G., and the like.

When adding the P.O. 43, 64, and 71 to ink, it is desirable to prepare a pigment dispersion thereof, and then add the same to ink. A method for producing the pigment dispersion is not particularly limited and, for example, a method including charging the P.O. 43, 64, and 71, a medium, and other arbitrary components, and then dispersing them by a high-speed disperser or the like are mentioned, for example. Furthermore, the dispersion may be performed by a bead mill, roll mill, or the like as necessary. Then, in order to remove particles which have a size equal to or larger than a certain size and which may be contained in the finally obtained pigment dispersion, filter filtration or centrifugal separation is performed. When performing the filter filtration, the pore size (mesh size) of a filter may be selected as appropriate in such a manner as to adjust the particle diameter of particles contained in the pigment dispersion to a predetermined particle diameter. It is a matter of course that the filter filtration may be performed in the preparation stage of the pigment dispersion, may be performed in the stage of preparing ink, or may be performed in each of the stage of preparing the pigment dispersion and the stage of preparing ink.

The volume average particle diameters of the P.O. 43, 64, and 71 contained in the solvent-based ink jet ink composition according to this embodiment are preferably 100 nm or more and 400 nm or less and more preferably 150 nm or more and 300 nm or less. Herein, the volume average particle diameter of the pigment can be evaluated by a laser diffraction•scattering method. Specifically, the volume average particle diameter can be measured by diluting a sample (pigment) formed into ink with DEGdEE (diethylene glycol diethyl ether) to be 1000 ppm or less, and then reading the value of the median diameter D50 under a 20° C. environment using a laser diffraction•scattering measuring device (for example, Microtrac UPA250 (manufactured by Nikkiso Co., Ltd.)). Therefore, even when two or more kinds of P.O. 43, 64, and 71 having a different volume average particle diameter are mixed and used, the volume average particle diameter of each P.O. 43, 64, and 71 and the volume average particle diameter of a mixture can also be measured.

With respect to the volume average particle diameters of the P.O. 43, 64, and 71, when commercially available items have a volume average particle diameter in the ranges mentioned above, the commercially-available items can be used as they are but the volume average particle diameter can be adjusted as follows. More specifically, a solvent (part or all) is mixed, and then the mixture (pigment dispersion solvent) is treated as appropriate by a ball mill, a bead mill, ultrasonication and/or a jet mill, or the like, whereby the particle diameter distribution and the volume average particle diameter can be adjusted.

Moreover, as a method for adjusting the volume average particle diameter of the P.O. 43, 64, and 71, a method including preparing a pigment having a small primary particle diameter, and then performing dispersion while changing the addition amount of a dispersant (described later) when mixing the same with a solvent (part or all) can be employed. More specifically, when the dispersant is sufficiently added, aggregation of primary particles can be prevented, and thus dispersion at a particle diameter which is not so different from the particle diameter of the primary particles can be performed, so that a volume average particle diameter based on the small primary particle diameter can be achieved. On the contrary, by reducing the addition amount of the dispersant, the primary particles are aggregated, and thus a volume average particle diameter based on the particle diameter of secondary particles can be achieved. In this case, the use of a start pigment having a smaller primary particle diameter is preferable because the degree of freedom of the adjustment of the volume average particle diameter increases. When the degree of freedom of the adjustment of the volume average particle diameter is demanded to further increase, the obtained pigment may be crushed once by a ball mill or the like as described above to further reduce the size, and then the average particle diameter may be adjusted using a dispersant.

The content of the P.O. 43, 64, and 71 based on the total mass of the solvent-based ink jet ink composition according to this embodiment is preferably 1% by mass or more and 10% by mass or less, more preferably 1% by mass or more and 8% by mass or less, still more preferably 1% by mass or more and 6% by mass or less, and particularly preferably 1% by mass or more and 5% by mass or less. Due to the fact that the content of the P.O. 43, 64, and 71 is in the ranges mentioned above, an orange ink of a special color having excellent color development performance can be obtained. In an image formed with the ink, the weatherability is good.

Red Ink

Examples of pigments for use in the red ink include C.I. Pigment Red (P.R.) 177, 179, 224, 254, 255, and 264. In particular, it is preferable to use P.R.254, 255, and 264 which are diketopyrrolopyrrole pigments. When such pigments are used, the balance of the comprehensive performance including weatherability, printing stability, and abrasion resistance can be improved.

The P.R. 254 is a diketopyrrolopyrrole pigment of CAS Registry Number 84632-65-5. The chemical formula is $C_{18}H_{10}C_{12}N_2O_2$ and the chemical name is 3,6-bis(4-chlorophenyl)-2,5-dihydropyrrolo[3,4-c]pyrrole-1,4-dione. For the P.R. 254, commercially-available items can also be used. For example, the P.R. 254 is available as "DPP Red BP P" of Ciba-Geigy Japan, Limited, "Pigment Red 254" of Tokyo Kasei Kogyo Co., Ltd., and the like.

The P.R. 255 is a diketopyrrolopyrrole pigment of CAS Registry Number 54660-00-3. The chemical formula is $C_{18}H_{12}N_2O_2$ and the chemical name is 3,6-diphenyl-2,5-dihydropyrrolo[3,4-c]pyrrole-1,4-dione. For the P.R. 255, commercially-available items can also be used. For example, the P.R. 255 is available as "Pigment Red 255" of Tokyo Kasei Kogyo Co., Ltd., "DPP Scarlet EK" of Ciba-Geigy Japan, Limited, and the like.

The P.R. 264 is a diketopyrrolopyrrole pigment of CAS Registry Number 88949-33-1. The chemical formula is $C_{30}H_{20}N_2O_2$ and the chemical name is 3,6-bis(4-biphenylyl)pyrrolo[3,4-c]pyrrole-1,4-dione. For the P.R. 264, commercially-available items can also be used. For example, the P.R. 264 is available as "Irgazin DPP Rubine FTX" and "Microlen DPP Rubine TR" of Ciba-Geigy Japan, Limited and the like.

1.3. Other Components

In this embodiment, the solvent-based ink jet ink composition may further contain components described below, such as a vinyl chloride resin or an acrylic resin as a fixing resin, a surfactant, and a dispersant.

1.3.1. Vinyl Chloride Resin

In this embodiment, examples of the vinyl chloride resin usable for the solvent-based ink jet ink composition include copolymers (hereinafter also referred to as a "vinyl chloride acetate copolymer") containing constituent units derived from vinyl chloride and vinyl acetate. The vinyl chloride acetate copolymer can be dissolved in the compounds represented by General Formula (1). As a result, ink can be firmly fixed to the surface of a recording medium containing the vinyl chloride resin due to the vinyl chloride acetate copolymer dissolved in the compounds represented by General Formula (1).

The vinyl chloride acetate copolymer can be obtained by a usual method and can be obtained by suspension polymerization, for example. Specifically, the suspension polymerization can be performed by charging water, a dispersant, and a polymerization initiator into a polymerizer, performing dehydration, and then pressing vinyl chloride and vinyl acetate thereinto or the suspension polymerization can be performed by pressing a part of vinyl chloride and vinyl acetate into a polymerizer to start a reaction, and then pressing the remaining vinyl chloride into the polymerizer during the reaction.

The vinyl chloride acetate copolymer preferably contains 70 to 90% by mass of the vinyl chloride unit as the configuration. When the content is in the range mentioned above, the vinyl chloride acetate copolymer is stably dissolved in the ink jet ink composition, and therefore the long-term storage stability is excellent. Furthermore, the discharge stability is excellent and excellent fixability to a recording medium can be obtained.

Moreover, the vinyl chloride acetate copolymer may have other constituent units as necessary together with the vinyl chloride unit and the vinyl acetate unit and, for example, a carboxylic acid unit, a vinyl alcohol unit, and a hydroxyalkyl acrylate unit are mentioned, and the vinyl alcohol unit is particularly preferably mentioned. The constituent units can be obtained by using a monomer corresponding to each unit mentioned above. Specific examples of monomers giving the carboxylic acid unit include maleic acid, itaconic acid, maleic acid anhydride, itaconic acid anhydride, acrylic acid, and methacrylic acid, for example. Specific examples of monomers giving the hydroxyalkyl acrylate unit include hydroxyethyl (meth)acrylate, hydroxyethyl vinyl ether, and the like, for example. The content of these monomers is not limited insofar as the effects of the invention are not impaired and, for example, copolymerization can be performed in the range of 15% by mass or less of the total amount of the monomers.

As the vinyl chloride acetate copolymer, commercially available items may be used and, for example, SOLBIN CN, SOLBIN CNL, SOLBIN C5R, SOLBIN TA5R, SOLBIN CL (all manufactured by Nisshin Chemical Co., Ltd.), and the like are mentioned.

The average polymerization degree of the vinyl chloride resin is not particularly limited and is preferably 150 to 1100 and more preferably 200 to 750. When the average polymerization degree of the vinyl chloride resin is in the ranges mentioned above, the vinyl chloride resin is stably dissolved into the solvent-based ink jet ink composition according to this embodiment, and therefore the long-term storage stability is excellent. Furthermore, the discharge stability is excellent and excellent fixability to a recording medium can be obtained. The average polymerization degree of the vinyl chloride resin is calculated from a measured specific viscosity and can be determined according to a method for calculating the average polymerization degree described in "JIS K6720-2".

The number average molecular weight of the vinyl chloride resin is not particularly limited and is preferably 10000 to 50000 and more preferably 12000 to 42000. The number average molecular weight can be measured by GPC and can be determined as a relative value in terms of polystyrene.

In this embodiment, the content of the vinyl chloride resin in the solvent-based ink jet ink composition can be set to, for example, 0.05% by mass or more and 6% by mass or less and preferably 0.5% by mass or more and 4% by mass or less. When the content of the vinyl chloride resin is in the ranges mentioned above, excellent fixability to a vinyl chloride-based recording medium is obtained due to the vinyl chloride resin dissolved in the compound represented by General Formula (1). As the vinyl chloride resin, any resin can be used besides the vinyl chloride acetate copolymer described above insofar as at least a constituent unit derived from vinyl chloride is contained.

In the solvent-based ink jet ink composition, the vinyl chloride resin and the compound represented by General Formula (1) are preferably contained at an amount ratio based on mass of 1:5 to 1:40. When the amount ratio is in the ranges mentioned above, the vinyl chloride resin can be easily dissolved into the compound represented by General Formula (1). Therefore, the ink fixability to the surface of a recording medium containing the vinyl chloride resin can be improved and clogging of a nozzle becomes difficult to occur.

1.3.2. Acrylic Resin

In this embodiment, to the solvent-based ink jet ink composition, acrylic resin may be added besides the vinyl chloride resin from the viewpoint of increasing the adhesiveness of an ink coating film of an image.

Examples of the acrylic resin include, for example, poly(meth)acrylic acid, poly(meth)methyl acrylate, poly(meth)ethyl acrylate, (meth)acrylic acid-(meth)acrylic acid ester copolymer resin, styrene-(meth)acryl copolymer resin, ethylene-(meth)acrylate copolymer resin, ethylene alkyl(meth)acrylate resin, ethylene-(meth)acrylic acid ester copolymer resin, and the like.

As the acrylic resin mentioned above, commercially-available items may be used and, for example, ACRYPET MF (Trade name, manufactured by Mitsubishi Rayon Co., Ltd., acrylic resin), SUMIPEX LG (Trade name, manufactured by Sumitomo Chemical Co., Ltd., acrylic resin), PARALOID B series (Trade name, manufactured by Rohm and Haas Co., acrylic resin), PARAPET G-1000P (Trade name, manufactured by Kuraray Co., Ltd., acrylic resin), and the like are mentioned. In the invention, the (meth)acrylic acid refers to both acrylic acid and methacrylic acid and the (meth)acrylate refers to both acrylate and methacrylate.

In this embodiment, the content of the acrylic resin in the solvent-based ink jet ink composition can be set to, for example, 0.5% by mass or more and 10% by mass or less and preferably 0.5% by mass or more and 6% by mass or less. When the content of the acrylic resin is in the ranges mentioned above, excellent fixability to a vinyl chloride-based recording medium is obtained.

1.3.3. Surfactant

In this embodiment, to the solvent-based ink jet ink composition, a silicon-based surfactant, a fluorine-based surfactant, or a polyoxy ethylene derivative which is a nonionic surfactant may be added besides the organic solvent described above from the viewpoint of reducing the surface tension and increasing the wettability with a recording medium.

As the silicon-based surfactant, it is preferable to use polyester-modified silicon and polyether-modified silicon.

As specific examples, BYK-347 and 348, BYK-UV3500, 3510, 3530, and 3570 (all manufactured by BYK Chemie, Japan) are mentioned.

As the fluorine-based surfactant, it is preferable to use a fluorine-modified polymer, and BYK-340 (manufactured by BYK Chemie, Japan) is mentioned as a specific example.

As the polyoxy ethylene derivative, it is preferable to use an acetylene glycol-based surfactant. As specific examples, Surfynol 82, 104, 465, and 485, and TG (all manufactured by Air Products, Japan, Inc.), Olefin STG and E1010 (all manufactured by Nisshin Chemical Co., Ltd.), Nissan Nonion A-10R and A-13R (all manufactured by NOF CORPORATION), FLOWLEN TG-740W and D-90 (manufactured by Kyoeisha Chemical Co., Ltd.), NOIGEN CX-100 (manufactured by Daiichi Kogyo Seiyaku Co., Ltd.), and the like are mentioned.

In this embodiment, the content of the surfactant in the solvent-based ink jet ink composition is preferably 0.05% by mass or more and 3% by mass or less and more preferably 0.5% by mass or more and 2% by mass or less.

1.3.4. Dispersant

In this embodiment, for the solvent-based ink jet ink composition, arbitrary dispersants for use in usual ink compositions can be used from the viewpoint of increasing the dispersion stability of the pigment. Specific examples of such dispersants include polyester-based polymer compounds, such as Hinoacto KF1-M, T-6000, T-7000, T-8000, T-8350P, and T-8000E (all manufactured by Takefu Fine Chemicals Co., Ltd.), Solsperse 20000, 24000, 32000, 32500, 33500, 34000, 35200, and 37500 (all "Solsperse" manufactured by LUBRIZOL), Disperbyk-161, 162, 163, 164, 166, 180, 190, 191, and 192 (all manufactured by BYK Chemie, Japan), FLOWLEN DOPA-17, 22, 33, and G-700 (all manufactured by Kyoeisha Chemical Co., Ltd.), AJISPER PB821 and PB711 (all manufactured by Ajinomoto Co., Inc.), LP4010, LP 4050, and LP 4055, POLYMER 400, 401, 402, 403, 450, 451, and 453 (all manufactured by EFKA Chemicals), and the like.

As the dispersants, metallic soap, polymer dispersants having a basic group, and the like can also be used and the polymer dispersants having a basic group are preferable. One having an amino group, an imino group, or a pyrrolidone group as the basic group is particularly preferable. As the polymer dispersants having the basic groups, polyalkylene polyamine, a salt of a long chain polyaminoamide and a high molecular weight acid ester, a salt of polyaminoamide and polar acid ester, modified polyurethane, polyester polyamine, and the like can be used.

As specific example of the polymer dispersants having the basic groups, "Anti-Terra-U (polyaminoamide phosphate)" manufactured by BYK Chemie, "Anti-Terra-204 (high molecular weight polycarboxylic acid salt)", and "Disperbyk-101 (polyaminoamide phosphate and acid ester) 130 (polyamide) can be mentioned. Moreover, Solsperse 5000 (phthalocyanine ammonium salt type), 13940 (polyester polyimine), 17000, 18000, 19000 (polyester polyamine), and 11200 (polyester polyimine) manufactured by Avecia Inc., can be mentioned. Moreover, V-216 and V-220 (polyvinyl pyrrolidone having a long chain alkyl group) manufactured by ISP can be mentioned.

In this embodiment, the content when the dispersant is used can be selected as appropriate according to the pigment to be contained and is preferably 5 parts by mass or more and 200 parts by mass or less and more preferably 30 parts by mass or more and 120 parts by mass or less based on the content (100 parts by mass) of the pigment in the ink composition.

1.3.5. Others

In this embodiment, the solvent-based ink jet ink composition can contain substances for giving predetermined performance, such as resin other than the vinyl chloride resin and the acrylic resin, a chelating agent, such as ethylenediaminetetraacetic acid salt (EDTA), an antiseptic/antifungal agent, and an antirust, besides the components described above.

As the resin other than the vinyl chloride resin and the acrylic resin, aliphatic polyester, aromatic polyester, polyurethane, epoxy resin, polyvinyl acetate, ethylene-vinyl acetate copolymer resin, polycarbonate, polyvinyl butyral, polyvinyl alcohol, phenoxy resin, ethyl cellulose resin, cellulose acetate propionate resin, cellulose acetate butyrate, nitrocellulose resin, polystyrene, vinyltoluene-α-methylstyrene copolymer resin, polyamide, polyimide, polysulfone resin, petroleum resin, chlorinated polypropylene, polyolefin, terpene-based resin, rosin-modified phenol resin, various kinds of synthetic rubber, such as NBR, SBR, and MBR, modified substances thereof, and the like may be used, for example. The resin mentioned above may be used alone or as a mixture of two or more kinds thereof.

1.4. Use and Effects

Due to the fact that the solvent-based ink jet ink composition is a solvent ink containing the solvent of General Formula (1), the image quality when recorded on a film medium, such as a vinyl chloride-based recording medium, is excellent. Therefore, the solvent-based ink jet ink composition is particularly suitably used for signs and the like to be exhibited outdoors. When the ink jet ink composition is used for signs and the like to be exhibited outdoors, the weatherability of an image is particularly excellent. Moreover, the discharge stability from an ink jet recording head can be secured and the occurrence of nozzle omission can be prevented.

When the glycol-diether-based solvent represented by General Formula (1) is used, no aggregation unevenness occurs in the obtained image, and the image quality is improved. In particular, the use of the solvent-based orange ink composition and the solvent-based red ink composition in combination allows the ink composition set according to this embodiment not only to extend a color reproduction range of a warm color to achieve wide reproduction of a warm color, such as orange or red, but to reduce the usage amount (adhesion amount) of the orange ink to thereby make the deterioration of the weatherability of an image due to orange pigments inconspicuous. Thus, an image excellent in color reproducibility and weatherability can be formed. Moreover, the weatherability of an image is improved when applied to the use in signs and the like exhibited outdoors by the use of the orange pigments relatively having weatherability.

Furthermore, when recording is performed by bringing the orange ink and the red ink into contact with each other on a recording medium, secondary color aggregation unevenness occurs in some cases. However, when the glycol-monoether-based solvent represented by General Formula (2) is used for ink, the secondary color aggregation unevenness can be reduced. Therefore, a wider color reproduction range can be achieved.

2. Recording Method

A recording method according to this embodiment includes performing recording on a recording medium using the ink composition set described above. According to the recording method according to this embodiment, the ink composition set described above is used, and therefore an image having good color reproducibility and weatherability can be formed.

The ink composition described above contains the solvent represented by General Formula (1) and the solvent interacts particularly with a vinyl chloride-based resin. Therefore, the recording method according to this embodiment is excellent in being firmly fixed onto a recording medium by recording an image by causing liquid droplets of the ink composition described above to adhere onto the surface of the vinyl chloride-based recording medium.

The vinyl chloride-based recording medium in the recording method according to this embodiment is not particularly limited insofar as a vinyl chloride resin is contained. Examples of the recording medium containing the vinyl chloride resin include a hard or elastic vinyl chloride-based film or sheet and the like. The solvent-based ink jet ink composition described above enables recording of an image on a non-treated surface in a vinyl chloride resin-based material and has an outstanding effect of eliminating the necessity of the use of an expensive recording medium, such as a former recording medium having a receiving layer, but it is a matter of course that the solvent-based ink jet ink composition can be applied even in the case of a base material having a treated surface by an ink receiving layer.

As a recording apparatus for use in the recording method according to this embodiment, an ink jet recording apparatus is preferable, and, although not particularly limited, a drop-on-demand type ink jet recording apparatus is preferable as the ink jet recording apparatus. Examples of the drop-on-demand type ink jet recording apparatus include apparatuses using a piezoelectric element recording method including performing recording using piezoelectric elements arranged in a recording head and apparatuses using a thermal jet recording method including performing recoding using thermal energy generated from heaters of heat-generating resistive elements arranged in a recording head, for example. Both the recording methods can be used. The ink composition set according to this embodiment can be advantageously used in an ink jet recording method including discharging the ink composition set from an ink jet recording head having discharge nozzles with an ink-repellent-treated surface.

3. Examples and Comparative Examples

The invention is further described below with reference to Examples and Comparative Examples but the invention is not particularly limited at all by the following examples. In Examples and Comparative Examples, "part(s)" and "%" are on a mass basis unless otherwise particularly specified.

3.1. Preparation of Ink Composition

3.1.1. Preparation of Pigment Dispersion Liquid

A pigment orange 43 (P.O. 43) was prepared as a pigment. A dispersion liquid was produced using Solsperse 17000 (manufactured by Lubrizol Corporation, polyester polyamine) as a dispersant. As a dispersion medium, a solvent having the largest content as a solvent in each ink composition example was used as a dispersion medium, and a pigment dispersion liquid was prepared.

Other pigments were treated in the same manner as described above to obtain pigment dispersion liquids.

3.1.2. Preparation of Ink Composition

Ink compositions different in the pigment type were prepared according to the material composition shown in Tables 1 to 3 using the pigment dispersion liquids prepared above. Each ink composition was prepared by placing the materials shown in the tables into a vessel, mixing and stirring the materials with a magnetic stirrer for 2 hours, and then filtering the resultant substance through a membrane filter with a pore size of 5 μm to remove impurities, such as wastes and coarse particles. The numerical values of the composition column in Tables 1 to 3 are indicated by % by mass.

Each ink composition is shown in Tables 1 to 3.

TABLE 1

| | | Flash point (° C.) | O1 | O2 | O3 | O4 | O5 | O6 | O7 | O8 | O9 | O10 | O11 | O12 | O13 | O14 |
|---|---|---|---|---|---|---|---|---|---|---|---|---|---|---|---|---|
| Orange pigment | P.O.43 | — | 3 | | | 3 | 3 | 3 | 3 | 3 | 3 | 3 | 3 | 3 | 3 | 3 |
| | P.O.64 | — | | 3 | | | | | | | | | | | | |
| | P.O.71 | — | | | 3 | | | | | | | | | | | |
| Solvent (1) | Diethylene glycol methylethyl ether | 64 | 73 | 73 | 73 | | | 83 | 58 | 20 | | | 83 | 73 | 73 | 73 |
| | Diethylene glycol diethyl ether | 71 | | | | 73 | | | | | | | | | | |
| | Diethylene glycol dimethyl ether | 56 | | | | | 73 | | | | | | | | | |
| Solvent (2) | Triethylene glycol monobutyl ether | 143 | 10 | 10 | 10 | 10 | 10 | | 25 | 10 | 10 | 10 | 10 | | | |
| | Tetraethylene glycol monobutyl ether | 177 | | | | | | | | | | | | 10 | | |
| | Dipropylene glycol monomethyl ether | 79 | | | | | | | | | | | | | 10 | |
| | Ethylene glycol monobutyl ether | 60 | | | | | | | | | | | | | | 10 |
| Other solvents | 1,3-butylene glycol diacetate | 100 | | | | | | | | 53 | 73 | | | | | |
| | Ethylene glycol monobutyl ether acetate | 71 | | | | | | | | | | 73 | | | | |
| Lactone | γ-butyrolactone | 98 | 10 | 10 | 10 | 10 | 10 | 10 | 10 | 10 | 10 | 10 | | 10 | 10 | 10 |
| Additives | Dispersant | — | 1.9 | 1.9 | 1.9 | 1.9 | 1.9 | 1.9 | 1.9 | 1.9 | 1.9 | 1.9 | 1.9 | 1.9 | 1.9 | 1.9 |
| | BYK-340 | — | 0.1 | 0.1 | 0.1 | 0.1 | 0.1 | 0.1 | 0.1 | 0.1 | 0.1 | 0.1 | 0.1 | 0.1 | 0.1 | 0.1 |
| | SOLBIN CL | — | 2 | 2 | 2 | 2 | 2 | 2 | 2 | 2 | 2 | 2 | 2 | 2 | 2 | 2 |
| Total | | | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

| | | Flash point (° C.) | R1 | R2 | R3 | R4 | R5 | R6 | R7 |
|---|---|---|---|---|---|---|---|---|---|
| Red pigment | P.R.254 | — | 3 | | | | 3 | 3 | 3 |
| | P.R.177 | — | | 3 | | | | | |
| | P.R.179 | — | | | 3 | | | | |
| | P.R.224 | — | | | | 3 | | | |
| Solvent (1) | Diethylene glycol methylethyl ether | 64 | 73 | 73 | 73 | 73 | 83 | | |
| | Diethylene glycol diethyl ether | 71 | | | | | | | |
| | Diethylene glycol dimethyl ether | 56 | | | | | | | |
| Solvent (2) | Triethylene glycol monobutyl ether | 143 | 10 | 10 | 10 | 10 | | 10 | 10 |
| | Tetraethylene glycol monobutyl ether | 177 | | | | | | | |
| | Dipropylene glycol monomethyl ether | 79 | | | | | | | |
| | Ethylene glycol monobutyl ether | 60 | | | | | | | |
| Other solvents | 1,3-butylene glycol diacetate | 100 | | | | | | 73 | |
| | Ethylene glycol monobutyl ether acetate | 71 | | | | | | | 73 |
| Lactone | γ-butyrolactone | 98 | 10 | 10 | 10 | 10 | 10 | 10 | 10 |
| Additives | Dispersant | — | 1.9 | 1.9 | 1.9 | 1.9 | 1.9 | 1.9 | 1.9 |
| | BYK-340 | — | 0.1 | 0.1 | 0.1 | 0.1 | 0.1 | 0.1 | 0.1 |
| | SOLBIN CL | — | 2 | 2 | 2 | 2 | 2 | 2 | 2 |
| Total | | | 100.0 | 100.0 | 100.0 | 100.0 | 100.0 | 100.0 | 100.0 |

TABLE 3

| | | Flash point (° C.) | T1 | T2 | T3 | T4 | T5 |
|---|---|---|---|---|---|---|---|
| Pigments other than orange and red pigments | P.B.15:3 | — | 3 | | | | 3 |
| | P.Y.155 | — | | 3 | | | |
| | P.R.122 | — | | | 3 | | |
| | P.Bk.7 | — | | | | 3 | |

TABLE 3-continued

| | | Flash point (° C.) | T1 | T2 | T3 | T4 | T5 |
|---|---|---|---|---|---|---|---|
| Solvent (1) | Diethylene glycol methylethyl ether | 64 | 73 | 73 | 73 | 73 | |
| | Diethylene glycol diethyl ether | 71 | | | | | |
| | Diethylene glycol dimethyl ether | 56 | | | | | |
| Solvent (2) | Triethylene glycol monobutyl ether | 143 | 10 | 10 | 10 | 10 | 10 |
| | Tetraethylene glycol monobutyl ether | 177 | | | | | |
| | Dipropylene glycol monomethyl ether | 79 | | | | | |
| | Ethylene glycol monobutyl ether | 60 | | | | | |
| Other solvents | 1,3-butylene glycol diacetate | 100 | | | | | 73 |
| | Ethylene glycol monobutyl ether acetate | 71 | | | | | |
| Lactone | γ-butyrolactone | 98 | 10 | 10 | 10 | 10 | 10 |
| Additives | Dispersant | — | 1.9 | 1.9 | 1.9 | 1.9 | 1.9 |
| | BYK-340 | — | 0.1 | 0.1 | 0.1 | 0.1 | 0.1 |
| | SOLBIN CL | — | 2 | 2 | 2 | 2 | 2 |
| Total | | | 100.0 | 100.0 | 100.0 | 100.0 | 100.0 |

The abbreviated names or Trade names shown in Tables 1 to 3 are as follows.
Orange Pigment
P.O. 43: C.I. Pigment Orange 43
P.O. 64: C.I. Pigment Orange 64
P.O. 71: C.I. Pigment Orange 71
Red Pigment
P.R. 254: C.I. Pigment Red 254
P.R. 177: C.I. Pigment Red 177
P.R. 179: C.I. Pigment Red 179
P.R. 224: C.I. Pigment Red 224
Other Pigments
P.B. 15:3: C.I. Pigment Blue 15:3
P.Y. 155: C.I. Pigment Yellow 155
P.R. 122: C.I. Pigment Red 122
P.Bk. 7: C.I. Pigment Black 7
Solvent 1
Diethylene glycol methyl ethyl ether: Trade name "Hysorb EDM", manufactured by Toho Chemical Industry Co., Ltd., Flash point of 64° C.
Diethylene glycol diethyl ether: Trade name "Diethylene glycol diethyl ether", manufactured by Tokyo Kasei Kogyo Co., Ltd., Flash point of 71° C.
Diethylene glycol dimethyl ether: Trade name "Diethylene glycol dimethyl ether", manufactured by Tokyo Kasei Kogyo Co., Ltd., Flash point of 56° C.
Solvent 2
Triethylene glycol monobutyl ether: Trade name "Butycenol 30", manufactured by KH Neochem Co., Ltd., Flash point of 143° C.
Tetraethylene glycol monobutyl ether: Trade name "Butycenol 40", manufactured by KH Neochem Co., Ltd., Flash point of 177° C.
Dipropylene glycol monomethyl ether: Trade name "Hysorb DPM", manufactured by Toho Chemical Industry Co., Ltd., Flash point of 79° C.
Ethylene glycol monobutyl ether: Trade name "Butycel", manufactured by KH Neochem Co., Ltd., Flash point of 60° C.
Other Solvents
1,3-butylene glycol diacetate: Trade name "1,3-Butanediol diacetate", manufactured by Santa Cruz Biotechnology, Flash point of 100° C.
Ethylene glycol monobutyl ether acetate: Trade name "Butycelacetate", manufactured by KH Neochem Co., Ltd., Flash point of 71° C.
Lactone
γ-butyrolactone: Trade name, manufactured by Kanto Kagaku, Inc.
Additives
Dispersant: Trade name "Solsperse 17000", manufactured by Lubrizol Corporation, Polyester polyamine resin
BYK340: Trade name, manufactured by BYK Chemie Japan, Inc., Silicon-based surfactant
SOLBIN CL: Trade name, manufactured by Nisshin Chemical Co., Ltd., Vinyl chloride-vinyl acetate copolymer (fixing resin)

3.1.3. Preparation of Ink Composition Set

The ink compositions obtained in Tables 1 to 3 were combined as shown in Table 4 to obtain ink composition sets. Each of the obtained ink composition sets was subjected to the following evaluation tests.

3.2. Evaluation Test 3.2.1. Evaluation of Print Image Quality (Aggregation Unevenness)

Using an ink jet printer (manufactured by Seiko Epson Corp. Model No. "SC-S70650", Converted machine), solid printing of a recording resolution of 720×720 dpi of each ink composition set in Examples and Comparative Examples was carried out on a vinyl chloride medium (manufactured by 3M, Model No. IJ180-10). During the recording, the recording medium was heated to 45° C., discharged from the printer after printing, and then dried by heating at 45° C. for 1 minute. Thereafter, the temperature of the evaluation sample was returned to room temperature (25° C.), and then aggregation unevenness of the pigment on the recording surface of the evaluation sample was visually observed to evaluate the aggregation unevenness.

Primary Color Aggregation

In the recording, a solid pattern was printed with the application amount of 10 mg/inch$^2$ using only either a red ink or an orange ink. More specifically, only an orange ink was used in Examples 1 to 14 and only a red ink was used in Examples 15 to 20. Then, in the obtained recorded matter, the obtained pattern was visually observed and observed with a loupe. The judgment criteria are as follows.

Judgment Criteria

⊙: By the observation with a loupe, no blurring of the ink around the pattern or no granularity inside the solid pattern is observed.

○: By the observation with a loupe, no blurring of the ink around the solid pattern is observed but granularity inside the solid pattern is observed.

Δ: By visual observation, granularity inside the solid pattern is observed but no blurring around the solid pattern is observed.

X: By visual observation, the blurring of ink is observed around the solid pattern.

Secondary Color Aggregation

In the recording, equivalent amounts of two kinds of a red ink and an orange ink were applied, and then a solid pattern was printed with an application amount of 10 mg/inch$^2$ in total. Then, in the obtained recorded matter, the solid pattern obtained by the application of the mixture of the two kinds of inks was visually observed and observed with a loupe. The judgment criteria are as follows.

Judgment Criteria

⊙: By the observation with a loupe, no granularity inside the solid pattern is observed.

○: By the observation with a loupe, granularity inside the solid pattern is observed but is not visually observed.

Δ: By visual observation, granularity inside the solid pattern is slightly observed.

X: By visual observation, granularity inside the solid pattern is considerably observed.

3.2.2. Evaluation of Abrasion Resistance

The recorded matter obtained in the secondary color agglutination test was subjected to abrasion resistance evaluation using a GAKUSHIN type rubbing fastness tester (manufactured by TESTER SANGYO CO. LTD., Product Name "AB-301"). Specifically, a cotton cloth (Shirting No. 20) was placed on the recording surface of the evaluation sample, and then rubbed back and forth 25 times under a 400 g load. Then, the peeling state of the recording surface of the evaluation sample after the rubbing was visually observed. The judgment criteria are as follows.

Judgment Criteria

○: No abrasion mark and no peeling are observed.

Δ: An abrasion mark is observed but no peeling is observed.

X: Peeling is observed.

3.2.3. Evaluation of Color Reproduction Range

In the recording above, all reproducible colors were printed while changing the application amount of the inks to be used using the ink set of each example. With respect to the obtained recorded matter, the printed pattern was color-measured using a tester: Spectrolino (manufactured by Gretag-Macbeth AG), and then the printable gamut volume in the Lab color space was calculated from the measurement results. The judgment criteria are as follows.

Judgment Criteria

⊙: Gamut volume of 720000 or more

○: Gamut volume of 710000 or more and less than 720000

Δ: Gamut volume of 700000 or more and less than 710000

X: Gamut volume of less than 700000

3.2.4. Evaluation of Weatherability

The obtained recorded matter obtained in the secondary color agglutination test was charged into a chamber of a xenon weather meter (manufactured by Suga Test Instruments Co., Ltd.), and then subjected to a cycle test of "Light irradiation for 25 minutes", "Light irradiation+Water dripping for 20 minutes", "Light irradiation for 30 minutes", and "Water dripping for 60 minutes" in this order. The execution conditions of the xenon weather meter are as follows. This cycle test was continuously performed for 4 weeks, and, after 4 weeks, the recorded matter was taken out. The taken-out recorded matter was measured for the OD value using a Gretag densitometer (manufactured by Gretag-Macbeth AG). Then, the OD value residual ratio (%) was determined. Among the three kinds of recorded matter having the first OD values of 0.5, 1.0, and the maximum value, the recorded matter with the lowest residual ratio was evaluated. The judgment criteria are as follows.

Judgment Criteria

○: The OD value residual ratio is 90% or more.

Δ: The OD value residual ratio is 80% or more and less than 90%.

X: The OD value residual ratio is less than 80%.

Execution Conditions of Xenon Weather Meter

Temperature and humidity: 40° C./50% RH

Irradiation intensity: 300 to 400 nm, 60 W/m$^2$ 3.3. Evaluation Results

The evaluation results are shown in the following table 4.

TABLE 4

| Ink set | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Orange ink | O1 | O2 | O3 | O4 | O5 | O6 | O7 | O8 | O9 | O10 | O11 | O12 |
| Red ink | R1 | R1 | R1 | R1 | R1 | R1 | R1 | R1 | R1 | R1 | R1 | R1 |
| Other inks | T1~4 | T1~4 | T1~4 | T1~4 | T1~4 | T1~4 | T1~4 | T1~4 | T1~4 | T1~4 | T1~4 | T1~4 |
| Primary color aggregation | ⊙ | ⊙ | ⊙ | ⊙ | ⊙ | ⊙ | ○ | Δ | X | X | ⊙ | ⊙ |
| Secondary color aggregation | ⊙ | ⊙ | ⊙ | ⊙ | ⊙ | Δ | ○ | Δ | X | X | ⊙ | ⊙ |
| Color reproducible range | ⊙ | ○ | Δ | ⊙ | ⊙ | ○ | ⊙ | ○ | Δ | Δ | ⊙ | ⊙ |
| Weatherability | ○ | Δ | ○ | ○ | ○ | ○ | ○ | ○ | ○ | ○ | ○ | ○ |
| Abrasion resistance | ○ | ○ | ○ | Δ | ○ | ○ | ○ | ○ | ○ | ○ | X | ○ |

| Ink set | Ex. 13 | Ex. 14 | Ex. 15 | Ex. 16 | Ex. 17 | Ex. 18 | Ex. 19 | Ex. 20 | Ex. 21 | Comp. Ex. 1 | Comp. Ex. 2 | Comp. Ex. 3 |
|---|---|---|---|---|---|---|---|---|---|---|---|---|
| Orange ink | O13 | O14 | O1 | O1 | O1 | O1 | O1 | O1 | O6 | O2 | O1 | — |
| Red ink | R1 | R1 | R2 | R3 | R4 | R5 | R6 | R7 | R5 | — | — | R1 |
| Other inks | T1~4 | T1~4 | T1~4 | T1~4 | T1~4 | T1~4 | T1~4 | T1~4 | T1~4 | T1~4 | T1~4 | T1~4 |
| Primary color aggregation | ⊙ | ○ | ⊙ | ⊙ | ⊙ | ⊙ | X | X | ⊙ | — | — | — |
| Secondary color aggregation | ○ | ○ | ⊙ | ⊙ | ⊙ | Δ | X | X | X | — | — | — |
| Color reproducible range | ⊙ | ○ | ○ | Δ | ○ | Δ | Δ | Δ | Δ | X | X | X |
| Weatherability | ○ | ○ | ○ | ○ | ○ | ○ | ○ | ○ | ○ | X | ○ | ○ |
| Abrasion resistance | ○ | ○ | ○ | ○ | ○ | ○ | ○ | ○ | ○ | ○ | ○ | ○ |

As in Comparative Examples, when an orange ink and a red ink were not combined and either one ink was used alone to form the ink sets, the result that the color reproducibility was poor was obtained. In Comparative Example 1 in which the P.O. 64 which is inferior in weatherability to the P.O. 43 was used, the result that the weatherability was poor was obtained due to the use of the P.O. 64 alone. The recording was performed under the same conditions only using other inks in place of using an orange ink and a red ink, and then primary color aggregation evaluation was performed. Then, the results of both T1 and T5 were evaluated as ⊙.

On the other hand, in Examples in which an orange ink and a red ink were combined, the color reproducibility was improved. When compared with Examples 9, 10, 19, and 20, in the examples in which the solvent which is the compound represented by General Formula (1) was used, the ink drying performance was good, the primary color aggregation and the secondary color aggregation were prevented, and thus good image quality was obtained. In Examples 7 and 8, the amount of the solvent which is the compound represented by General Formula (1) was small, and therefore aggregation slightly occurred. From Example 2, the P.O. 64 was inferior in weatherability to the P.O. 43, but the usage amount of the orange pigment in the image decreases due to the combination use with a red ink, and therefore the weatherability was somewhat improved. From Example 3, the P.O. 71 was inferior in color reproducibility to the P.O. 43, but the weatherability was relatively improved. Thus, according to the ink composition set according to an aspect of the invention, it has been found that an ink composition set and a recording method capable of forming an image excellent in weatherability and color reproducibility can be achieved.

The invention is not limited to the above-described embodiment, and can be modified in various manners. For example, the invention includes the substantially same structure (e.g., structure with same function(s), method(s), and result(s) or structure with the same object(s) and effect(s)) as the structures described with the embodiment. The invention also includes a structure in which non-essential portions of the structures described in the embodiments are replaced. The invention also includes a structure that can demonstrate the same effects or a structure that can achieve the same objects as those in the structures described with the embodiment. The invention also includes a structure in which known techniques are added to the structures described in the embodiment.

The entire disclosure of Japanese Patent Application No. 2016-014071, filed Jan. 28, 2016 is expressly incorporated by reference herein.

What is claimed is:

1. An ink composition set, comprising at least:
a solvent-based orange ink composition containing an orange pigment as a pigment and a solvent; and
a solvent-based red ink composition containing a red pigment as a pigment and a solvent,
wherein at least either the solvent contained in the solvent-based orange ink composition or the solvent contained in the solvent-based red ink composition contains a compound represented by General Formula (2) shown below,

$$R^4\text{—}(R^5O)_n\text{—}OH \qquad (2),$$

wherein, in General Formula (2), $R^4$ represents an alkyl group in which the number of carbon atoms is 1 or more and 5 or less, $R^5$ represents an alkylene group in which the number of carbon atoms is 2 or more and 4 or less, and n represents an integer of 1 to 8.

2. The ink composition set according to claim 1, wherein the solvent contained in the solvent-based orange ink composition and the solvent contained in the solvent-based red ink composition each independently contain a compound represented by General Formula (1) shown below,

$$R^1O\text{—}(R^2O)_m\text{—}R^3 \qquad (1),$$

wherein, in General Formula (1), $R^1$ and $R^3$ each independently represent an alkyl group in which the number of carbon atoms is 1 or more and 5 or less, $R^2$ represents an alkylene group in which the number of carbon atoms is 2 or more and 4 or less, and m represents an integer of 1 to 8.

3. The ink composition set according to claim 1, further comprising at least:
a solvent-based cyan ink composition containing a pigment and a solvent;
a solvent-based yellow ink composition containing a pigment and a solvent;
a solvent-based magenta ink composition containing a pigment and a solvent; and
a solvent-based black ink composition containing a pigment and a solvent.

4. The ink composition set according to claim 1 comprising:
a diketopyrrolopyrrole pigment as the red pigment contained in the solvent-based red ink composition; and
at least any one selected from C.I. Pigment Orange 43, C.I. Pigment Orange 64, and C.I. Pigment Orange 71 as the orange pigment contained in the solvent-based orange ink composition.

5. The ink composition set according to claim 1, which is used for an ink jet recording method.

6. The ink composition set according to claim 2, wherein a content of the compound represented by General Formula (1) is 40% by mass or more in the solvent-based orange ink composition and the solvent-based red ink composition.

7. The ink composition set according to claim 1, wherein a content of the compound represented by General Formula (2) is 5% by mass or more and 25% by mass or less in at least either the solvent-based orange ink composition or the solvent-based red ink composition.

8. The ink composition set according to claim 1, which is used for an ink jet recording method,
the method including:
discharging the ink composition from an ink jet head and causing the ink composition to adhere to a heated recording medium.

9. The ink composition set according to claim 1, wherein at least either the solvent-based orange ink composition or the solvent-based red ink composition contains a fixing resin and a lactone compound as the solvent.

10. The ink composition set according to claim 1, wherein the solvent-based orange ink composition and the solvent-based red ink composition each contain a compound having a flash point of 70° C. or less as the compound represented by General Formula (1).

11. A recording method, which is carried out using the ink composition set according to claim 1.

12. A recording method, which is carried out using the ink composition set according to claim 2.

13. A recording method, which is carried out using the ink composition set according to claim 3.

14. A recording method, which is carried out using the ink composition set according to claim 4.

15. A recording method, which is carried out using the ink composition set according to claim 5.

16. A recording method, which is carried out using the ink composition set according to claim 6.

17. A recording method, which is carried out using the ink composition set according to claim 7.

18. A recording method, which is carried out using the ink composition set according to claim 8.

\* \* \* \* \*